(12) United States Patent
Zuo et al.

(10) Patent No.: US 7,264,495 B2
(45) Date of Patent: Sep. 4, 2007

(54) SIM CARD HOLDER

(75) Inventors: Zhou-Quan Zuo, Shenzhen (CN); Chia-Hua Chen, Tu-cheng (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 11/384,473

(22) Filed: Mar. 20, 2006

(65) Prior Publication Data

US 2006/0281356 A1    Dec. 14, 2006

(30) Foreign Application Priority Data

Jun. 10, 2005    (CN) ................. 2005 1 0035294

(51) Int. Cl.
*H01R 13/62* (2006.01)

(52) U.S. Cl. .................................... 439/326

(58) Field of Classification Search ............... 439/326, 439/325, 327, 372, 630
See application file for complete search history.

(56) References Cited

U.S. PATENT DOCUMENTS

| | | | |
|---|---|---|---|
| 6,106,317 A * | 8/2000 | Michaelis et al. | 439/326 |
| 6,174,188 B1 * | 1/2001 | Martucci | 439/326 |
| 6,210,193 B1 * | 4/2001 | Ito et al. | 439/326 |
| 6,220,882 B1 * | 4/2001 | Simmel et al. | 439/326 |
| 6,743,035 B1 * | 6/2004 | Yang | 439/326 |
| 6,881,086 B2 * | 4/2005 | Ohashi | 439/326 |
| 6,888,724 B2 * | 5/2005 | Shaie | 361/719 |
| 6,913,479 B1 * | 7/2005 | Su et al. | 439/326 |
| 6,951,472 B2 * | 10/2005 | Shih | 439/326 |
| 7,048,566 B2 * | 5/2006 | Natori | 439/326 |
| 2004/0092149 A1 * | 5/2004 | Scuteri et al. | 439/326 |
| 2005/0208814 A1 * | 9/2005 | Tsai et al. | 439/326 |

FOREIGN PATENT DOCUMENTS

CN    200320116778.6    3/2005

* cited by examiner

*Primary Examiner*—Gary F. Paumen
(74) *Attorney, Agent, or Firm*—Jeffrey T. Knapp (57) ABSTRACT

A SIM card holder includes a base (10) and a catching mechanism (20). The base defines a receiving groove (114) and a slot (110). The receiving groove is configured for receiving the SIM card therein. The base comprises a protrusion (108). The protrusion and the slot are arranged at two opposite sides of the receiving groove. The catching mechanism comprises a main board (201) having a bending piece (202) and a bending hem (204) at two opposite ends thereof. The bending piece is detachably engaged with the base, and the bending hem is constantly retained in the slot of the base. The main board comprises an elastic slice resisting the protrusion of the base when the bending piece being engaged with the base. The catching mechanism is movable relative to the base and rotatable about the end of the bending hem when the slice disengages from the protrusion.

18 Claims, 9 Drawing Sheets

SIM CARD HOLDER

BACKGROUND OF THE INVENTION

1. Field of the Invention

The present invention relates to SIM card (subscriber identification module card) holders and, particularly, to a SIM card holder for seating a SIM card in an electronic device such as a mobile phone.

2. Discussion of the Related Art

Nowadays, mobile phones are widely used and bring convenience to our lives, mobile phones have become a part of modern life. Every mobile phone has a SIM card for carrying information which is necessary for people to operate the mobile phone. The SIM card may also contain personal information for the subscriber, for example, a listing of frequently used telephone numbers. Therefore, a SIM card holder is necessary for holding the SIM card in electronic devices such as mobile phones.

Figure 1:
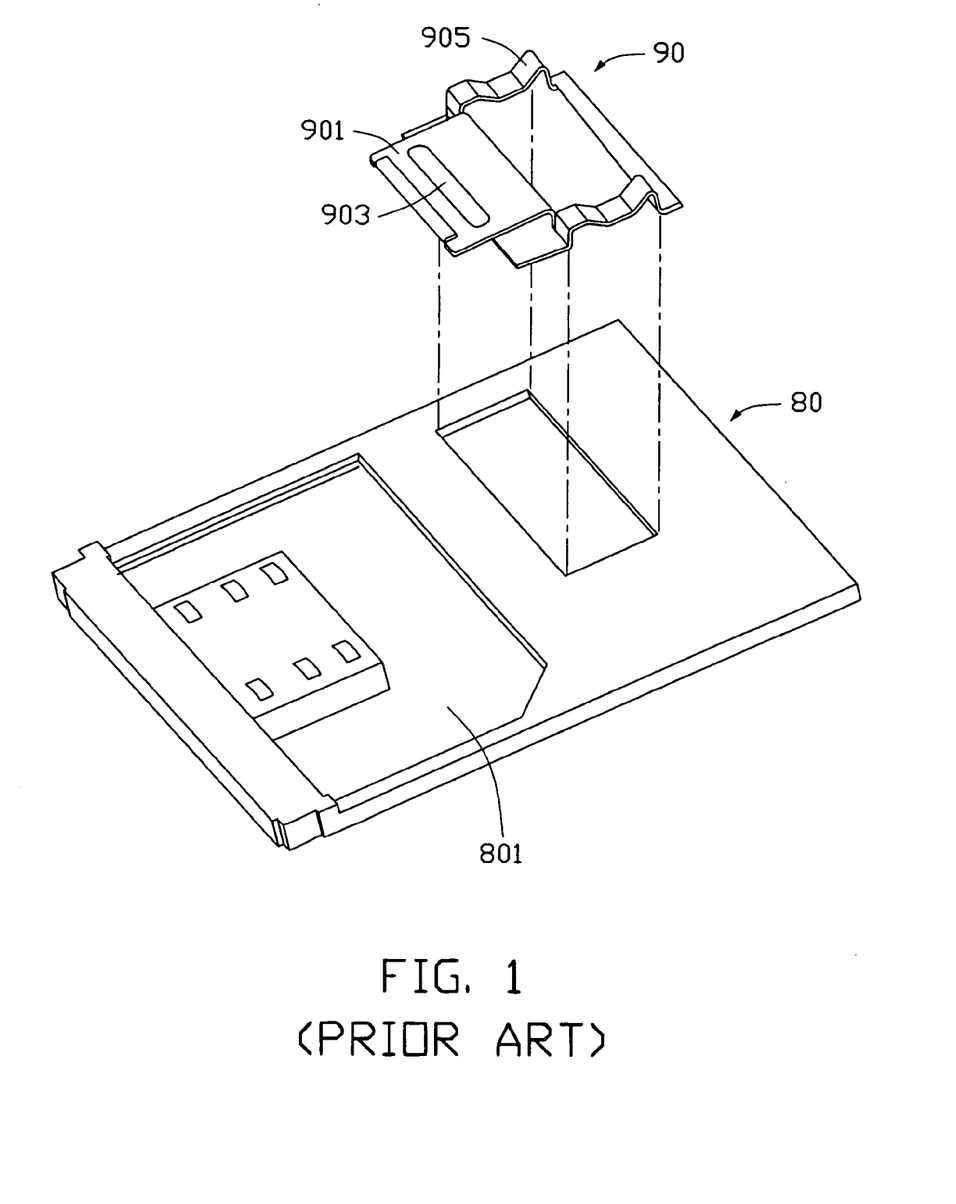
FIG. 1 is an exploded, isometric view of a conventional SIM card holder.

Referring to FIG. 1, a typical SIM card holder is disclosed as follows. The SIM card holder includes a mounting base 80 and a locking element 90. A receiving groove 801 is defined in the mounting base 80 for receiving a SIM card. The locking element 90 includes a fixing portion 901, an operating portion 903 and a deformable portion 905. The locking element 90 is mounted on the mounting base 80. The fixing portion 901 protrudes over the receiving groove 801 to hold the SIM card. When the operating portion 903 is pulled manually, the deformable portion 905 deforms and the fixing portion 901 moves away from the receiving groove 801, thereby the SIM card can be removed from the receiving groove 801 of the mounting base 80.

It can be seen that the deformable portion 905 of the locking element 90 is very large, and a height of the deformable portion 905 will increase when pulling the operating portion 903. Thus, the SIM card holder occupies too much space, which results in an overly large size for electronic devices such as mobile phones. In addition, when a person is installing or removing the SIM card, he or she must hold the mobile phone and operate the locking element 90 with one hand and remove the SIM card simultaneously with another hand. That is, it is the SIM card holder can be difficult for users to operate.

What is needed, therefore, is a SIM card holder which has small height and which can be easily operated.

SUMMARY OF THE INVENTION

A SIM card holder includes a base and a catching mechanism. The base defines a receiving groove and a slot. The receiving groove is configured for receiving the SIM card therein. The base comprises a protrusion. The protrusion and the slot are arranged at two opposite sides of the receiving groove. The catching mechanism comprises a main board having a bending piece and a bending hem at two opposite ends thereof. The bending piece is detachably engaged with the base, and the bending hem is constantly retained in the slot of the base. An engagement of the bending piece and the base prevents the catching mechanism from sliding along a first direction parallel to the base, when the bending piece engages with the base. The main board comprises an elastic slice resisting the protrusion of the base when the bending piece is engaged with the base. The catching mechanism is movable parallel along a second opposing direction relative to the base and rotatable about the end of the bending hem when the slice disengages from the protrusion.

Other advantages and novel features of the preferred embodiments of the present hinge system and its applications will become more apparent from the following detailed description when taken in conjunction with the accompanying drawings.

BRIEF DESCRIPTION OF THE DRAWINGS

Many aspects of the present SIM card holders and their applications can be better understood with reference to the following drawings. The components in the drawings are not necessarily drawn to scale, the emphasis instead being placed upon clearly illustrating the principles of the SIM card holders. Moreover, in the drawings, like reference numerals designate corresponding parts throughout the several views.

DETAILED DESCRIPTION OF PREFERRED EMBODIMENTS

Figure 2:
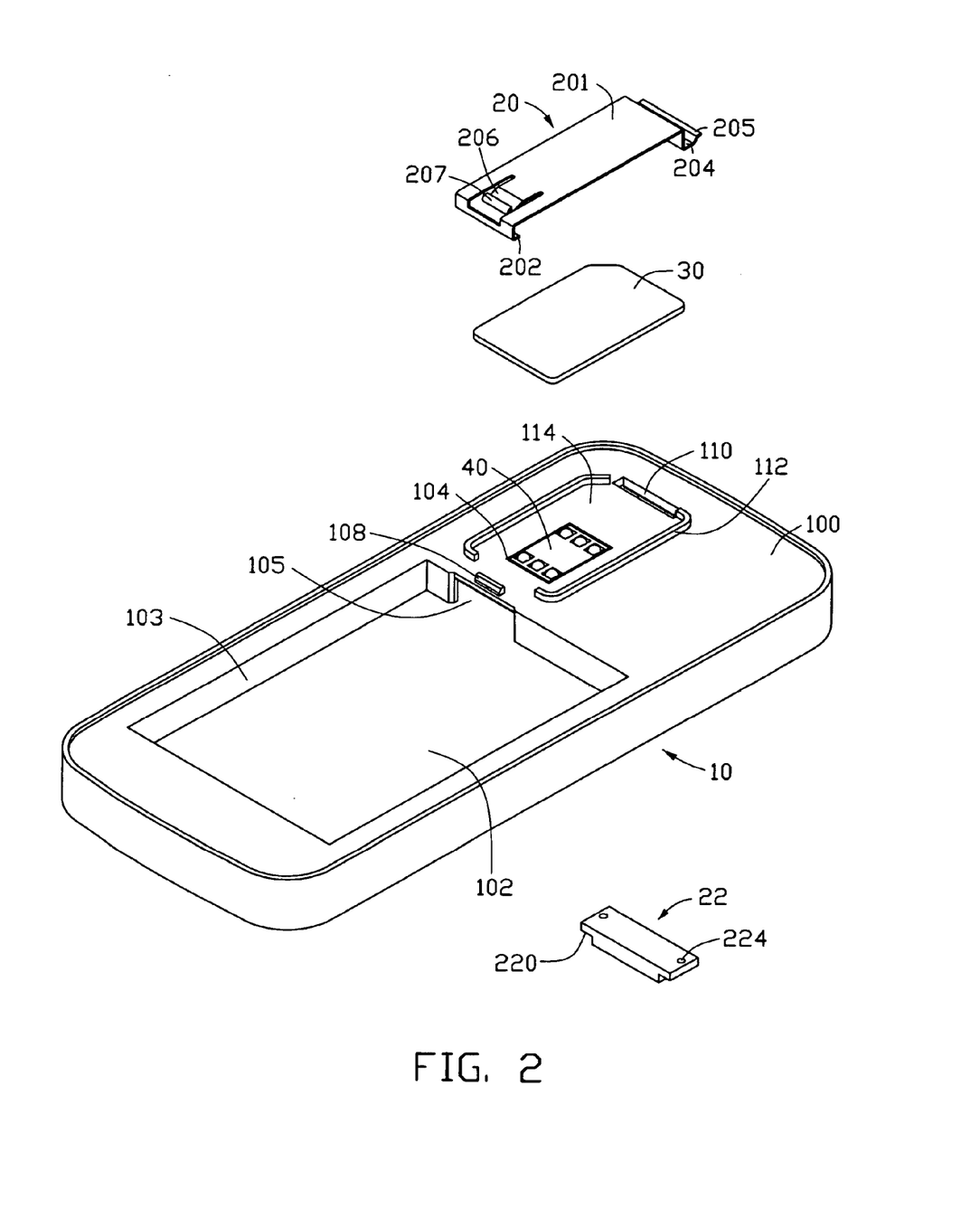
FIG 2 is an exploded, isometric view of a SIM card holder in accordance with a present embodiment.
Figure 3:
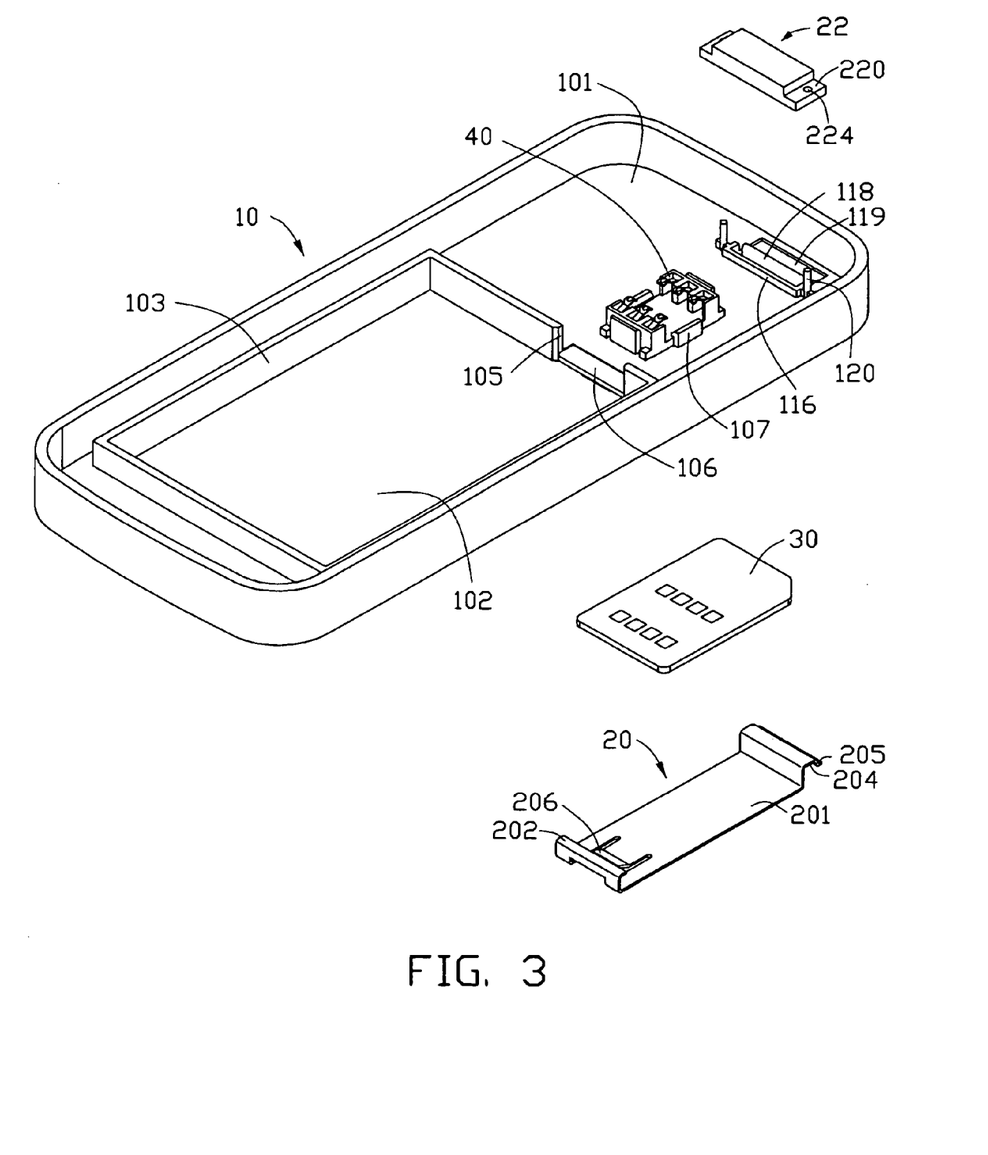
FIG. 3 is similar to FIG. 2, but viewed from another direction.

Referring to FIG. 2 and FIG. 3, a SIM card holder includes a housing 10, a catching mechanism 20 and a block 22. A SIM card 30 is fixed on the housing 10 by the catching mechanism 20, and the SIM card 30 is electrically connected to a printed circuit board (PCB, not shown) by a connector 40.

The housing 10 is approximately cuboid-shaped with a front surface 100 and a back surface 101. A receiving cavity 102 is defined in the housing 10 at a bottom portion for receiving a battery (not shown), and an opening 104 is defined in a top portion of the housing 10 at the first surface 100 for receiving the connector 40. The receiving cavity 102 is defined by four sidewalls 103. A cutout 105 is defined in one sidewall 103 near the opening 104. A first hollow 106 is defined in the housing 10 adjacent to the cutout 105 at the back surface 101. Four catch pieces 107 are formed on the back surface 101 of the housing 10 surrounding the opening 104 for housing the connector 40. The connector 40 is disposed at the back surface 101 and exposed out of the front surface 100 via the opening 104. Being adjacent to the cutout 105, a protrusion 108 is formed on the front surface 100 of the housing 10, and located between the cutout 105 and the opening 104. A slot 110 is defined at the front surface 100 of the housing 10 and is opposite to the protrusion 108 relative to the opening 104. Two strips 112 are formed on the housing 10 at the front surface 100 and are perpendicular to the protrusion 108 and the slot 110. Two ends of each strip 112 bend towards the other strips 112, thereby cooperatively defining a receiving groove 114 for receiving the SIM card 30. A batten 116 and a projection 118 are formed on the housing 10 at the back surface 101. The batten 116 and the projection 118 are arranged at two opposite edges of the slot 110, and the batten 116 is nearer to the opening 104 than the projection 118 to the opening 104. A second hollow 119 is defined next to the projection 118. Two posts 120 are formed at two ends of the batten 116.

The catching mechanism 20 is approximately sheet-shaped having a main board 201. Two ends of the main board 201 perpendicularly bend in a same direction to form first bent portions end part of the first bent portions further perpendicularly bend in a same direction to form second bent portions, thereby forming a bending piece 202 and an opposite bending hem 204 at two ends of the main board 201. The bending piece 202 bends inward of the main board 201 and the bending hem 204 bends outward of the main board 201. A warp 205 is formed at the end of the bending hem 204 by bending the end of the bending hem 24. An elastic slice 206 is forced out of the main board 201 adjacent to the end of the bending piece 202 by punching and is disposed between the bending piece 202 and the bending hem 204. One end of the slice 206 adjacent to the bending piece 202 is free end and an opposite end is connected to the main board 201. A hook 207 is formed at the free end of the slice 206. A width of the main board 201 is dimensioned corresponding to a minimal distance between the two strips 112 of the housing 10. A width of the slice 206 is dimensioned corresponding to a length of the protrusion 108. The bending hem 204 of the catching mechanism 20 is inserted into the slot 110 of the housing 10 and the slice 206 is configured to resist the protrusion 108.

The SIM card 30 carries information that is necessary for operating the telephone and personal information of the owner. The SIM card 30 is a kind of integrated circuit card. The SIM card 30 is mounted in the receiving groove 114 in contact with the connector 40.

The block 22 forms two opposite steps 220 by removing a part of two opposite ends of the block 22. Two holes 224 are respectively defined in the two steps 220. The posts 120 of the housing 10 are firmly inserted into the holes 224 of the block 22 for attaching the block 22 onto the housing 10.

Figure 4:
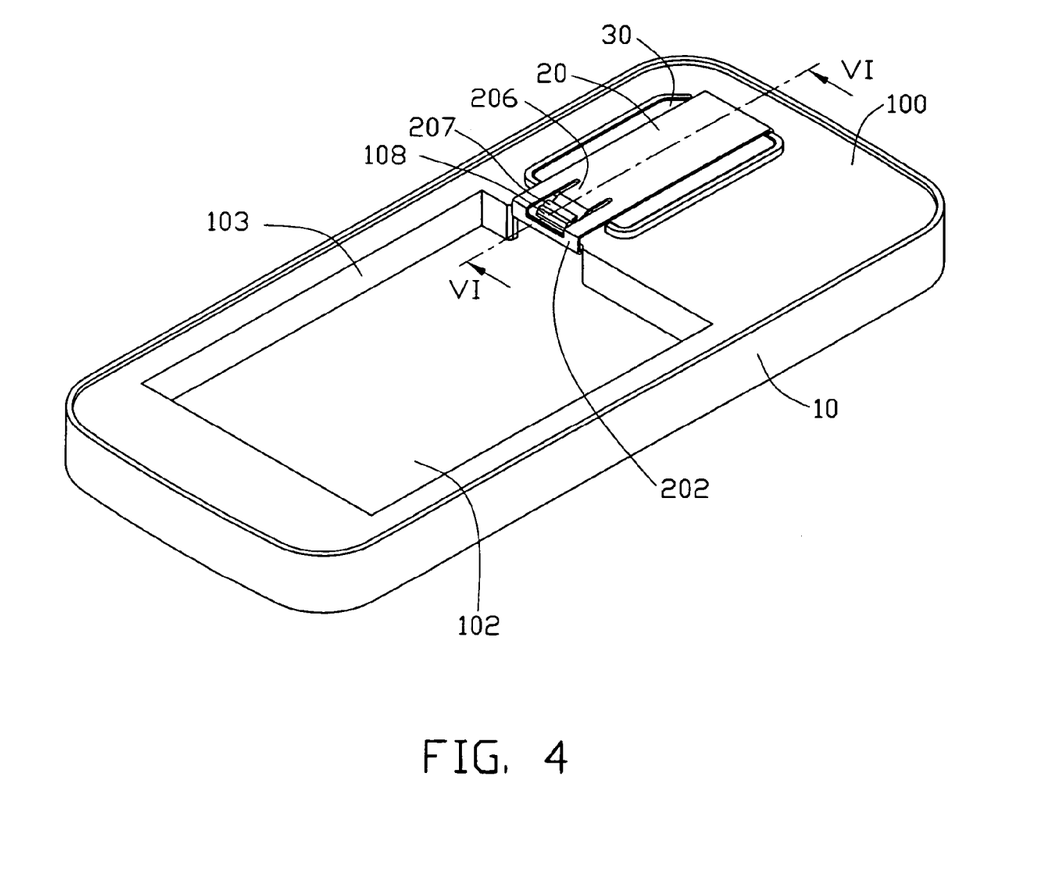
FIG. 4 is an assembled, isometric view of the SIM card holder of FIG. 2.
Figure 5:
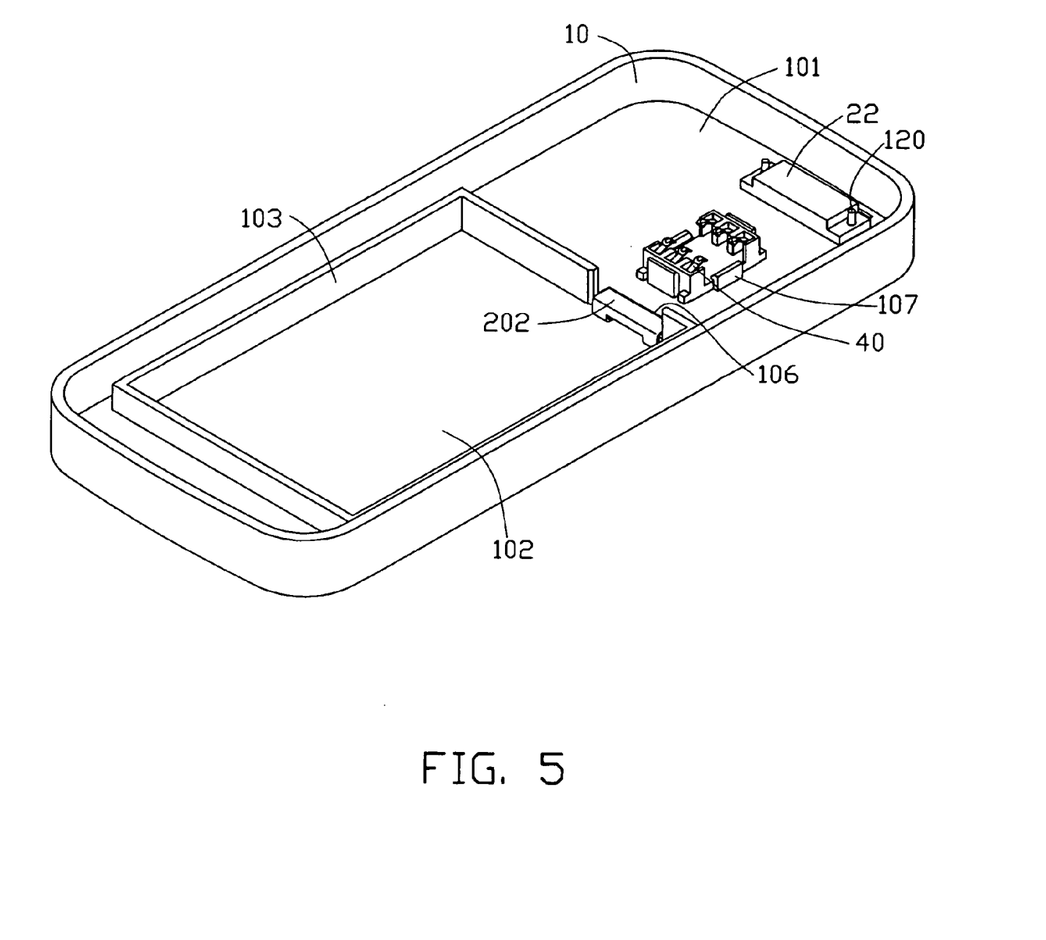
FIG. 5 is similar to FIG. 4, but viewed from another direction.
Figure 6:
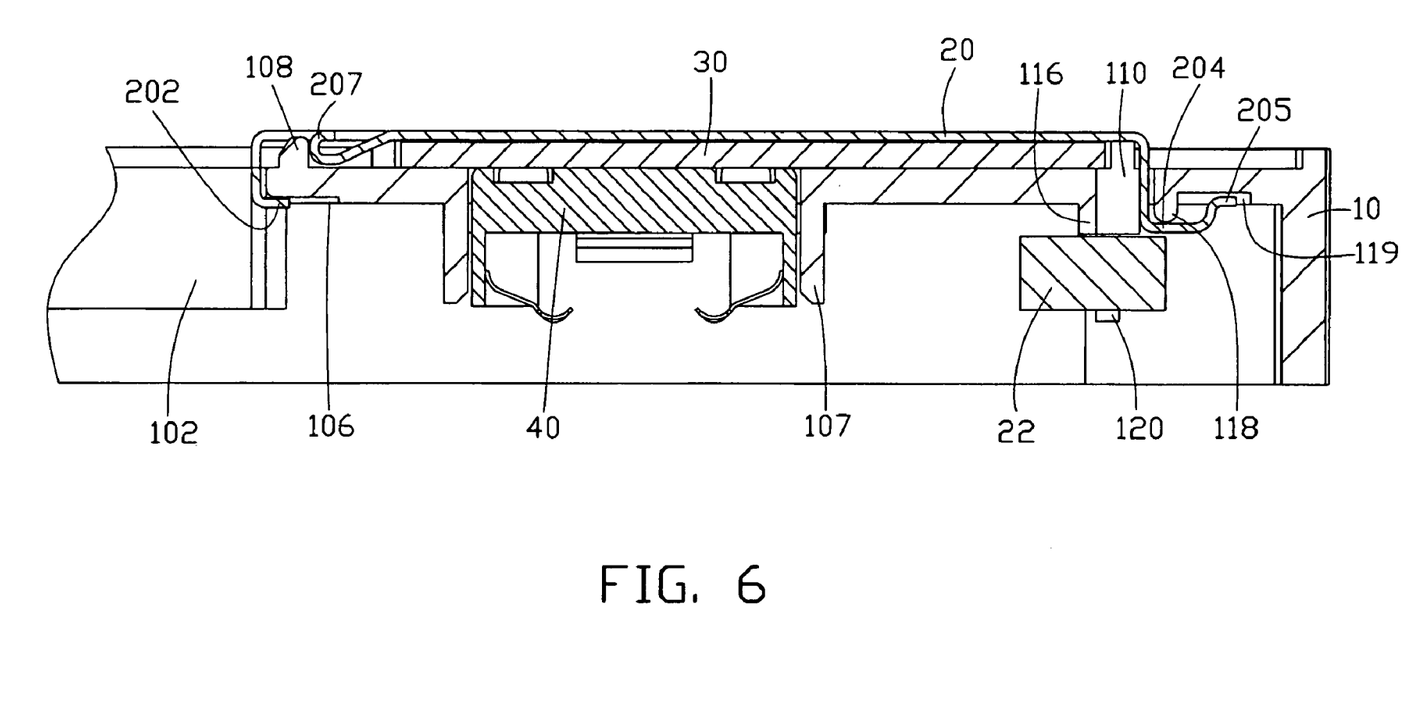
FIG. 6 is a cross-sectional view of the SIM card holder taken along the line VI-VI in FIG. 4, showing a first state.

Referring to FIGS. 4 though 6, in assembly, the bending hem 204 of the catching mechanism 20 is inserted into the slot 110 of the housing 10, and the catching mechanism 20 is rotated through about an angle of 90° afterwards to make the main board 201 approximately parallel to the front surface 100 of the housing 10. The catching mechanism 20 is moved in a direction parallel to the strips 112 to make the catching mechanism 20 move towards the receiving cavity 102. Then the catching mechanism 20 is pressed downwards. The catching mechanism 20 is moved in a direction parallel to the strips 110 to make the catching mechanism 20 move away from the receiving cavity 102, thereby engaging bending piece 202 with the first hollow 106 of the housing 10 and the bending hem 204 engages with the projection 118 of the housing 10. The warp 205 of the catching mechanism 20 is set in the second hollow 119. The hook 207 of the catching mechanism 20 resists the protrusion 108. A combination of the bending piece 202, the bending hem 204 and the hook 207 with the housing 10 holds the catching mechanism 20 in position. Finally, the block 22 is mounted upon the slot 110 to cover the slot 110 from the back surface 101. A gap (not labeled) is defined between the projection 118 and the block 22 for receiving the bending hem 204. Thereby, the SIM card holder is assembled. It can be seen that the SIM card holder merely includes three simple elements, i.e. the housing 10, the catching mechanism 20 and the block 22. Thus, the SIM card holder is quite simple. In addition, the catching mechanism 20 is a thin board. Thus, the SIM card holder does not occupy much space.

Figure 7:
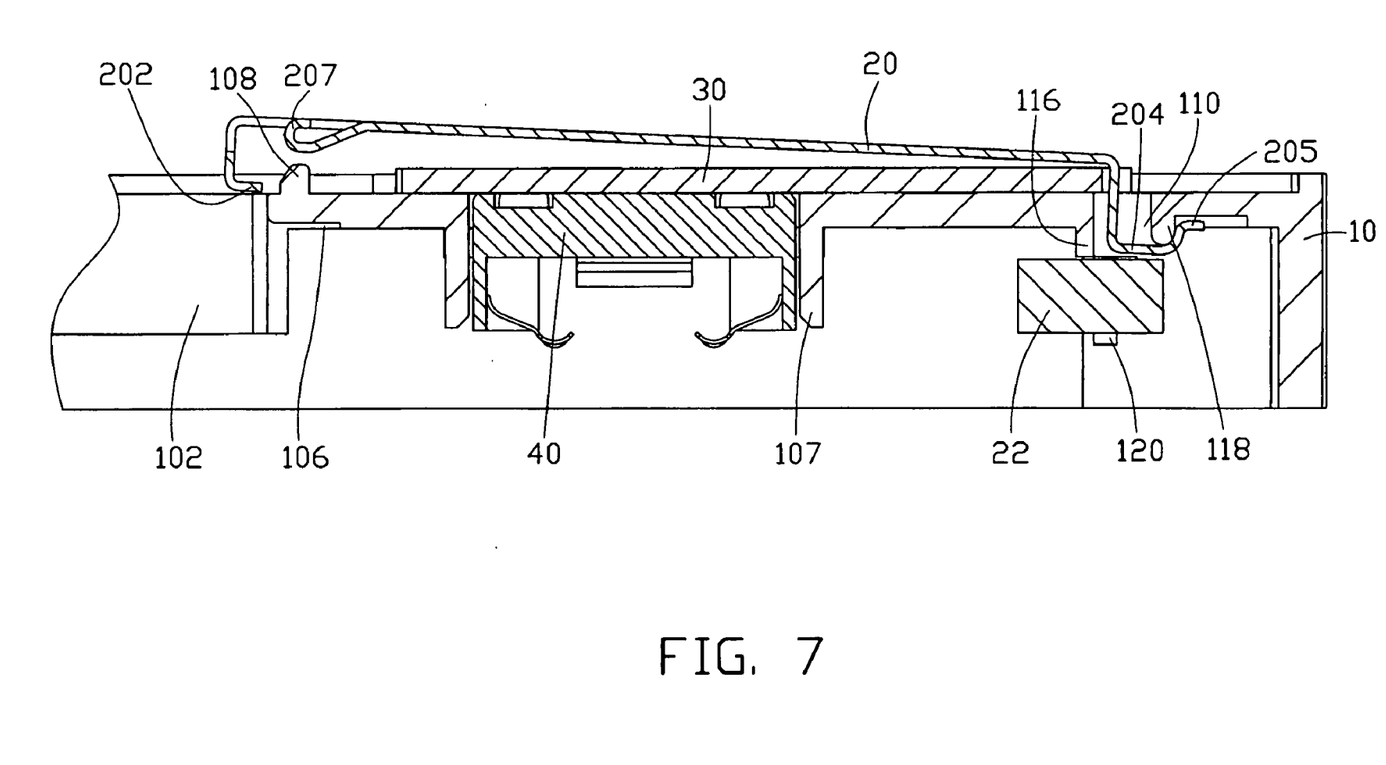
FIG. 7 is similar to FIG. 6, showing a second state of the SIM card holder.
Figure 8:
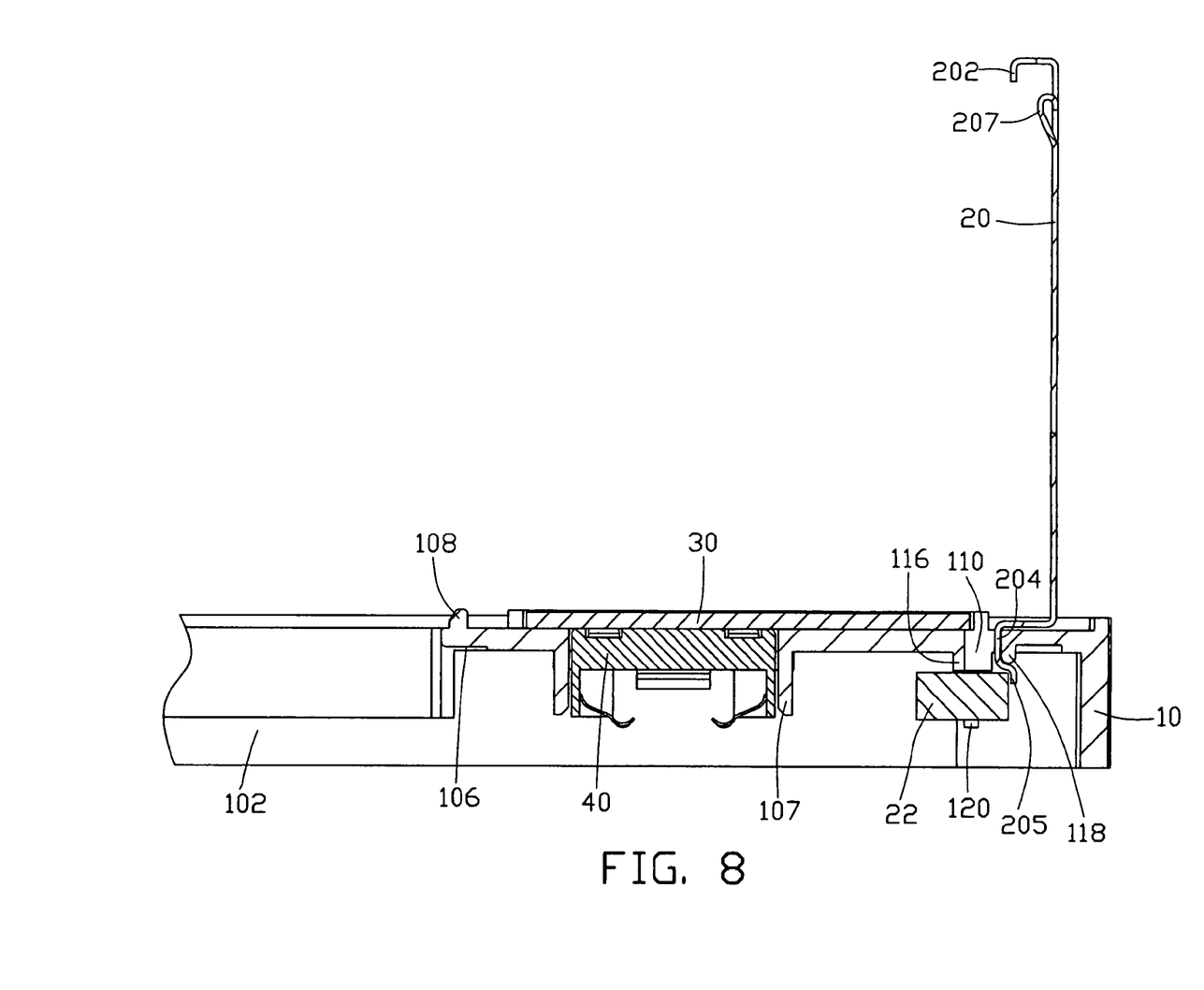
FIG. 8 is similar to FIG. 6, showing a third state of the SIM card holder.

Referring to the FIG. 7 and FIG 8, when removing the SIM card 30, at first, the hook 207 of the catching mechanism 20 is clawed away from <Comment: let's avoid this insert; it sounds too much like new matter to risk it> the front surface 100 of the housing 10 and raised over the protrusion 108 of the housing 10, then the catching mechanism 20 is moved in a direction parallel relative to the front surface 100 of the housing towards the receiving cavity 102. The bending piece 202 is separated from the first hollow 106 of the housing 10 and the warp 205 of the bending hem 204 slides in the second hollow 119 until the warp 205 resists the projection 118. Finally, the catching mechanism 20 is rotated an angle circling the warp 205 shown in FIG. 8, thereby the SIM card is made removable from the housing 10. The bending hem 204 cannot be removed out from the slot 110 for the warp 205 being caught by the block 22 and the projection 118 cooperatively. As such, the SIM card 30 can be removed from the housing 10. A process of installing the SIM card 30 is substantially the reverse of the above-described removing process.

Figure 9:
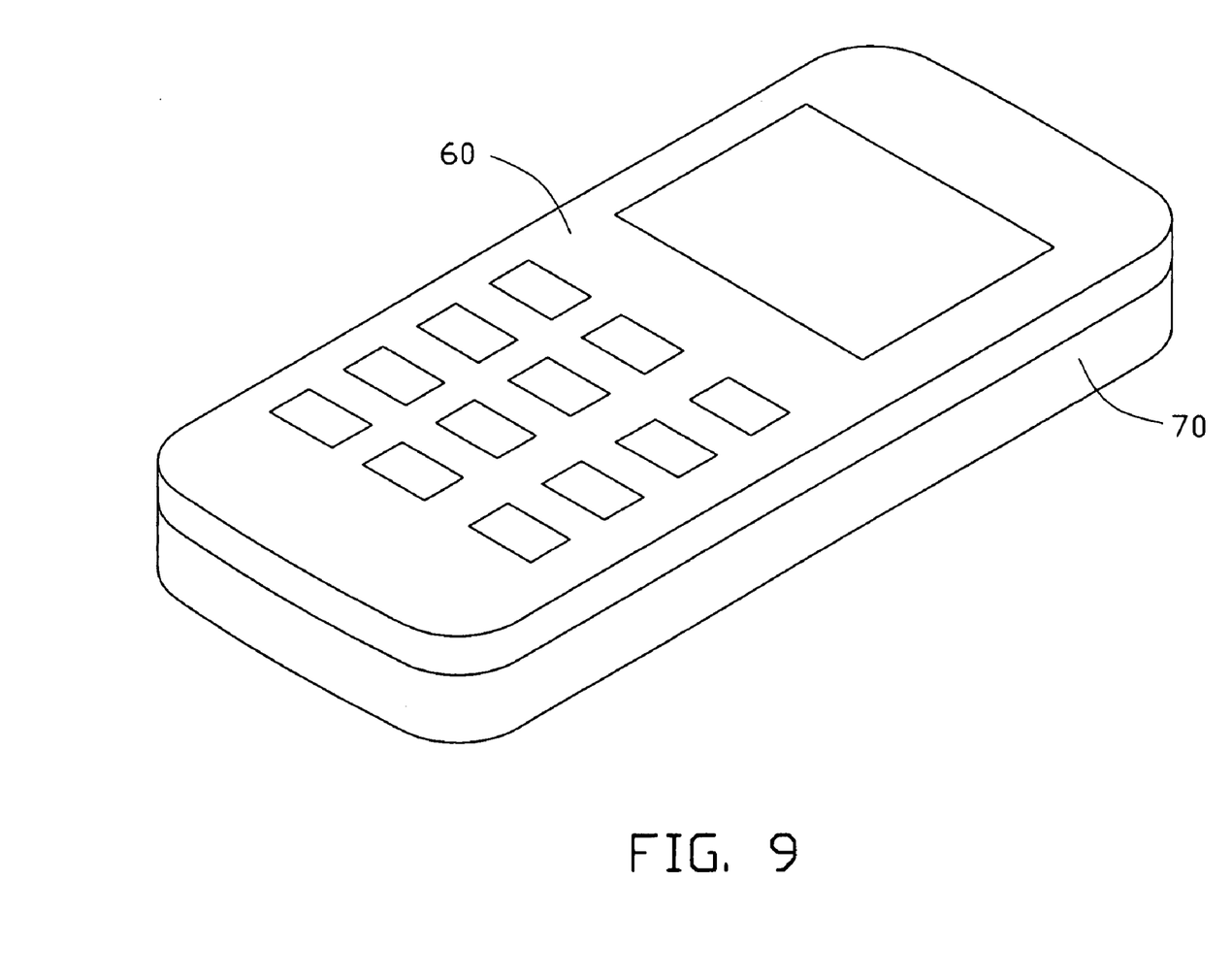
FIG. 9 is an isometric view of a mobile phone which employs the SIM card holder.

Referring to FIG. 9, the SIM card holder is applied in an exemplary mobile phone having a front cover 60 and a rear cover 70. The front cover 60 and the rear cover 70 cooperatively define an enclosed space. The housing 10 is mounted in the enclosed space.

In alternative embodiment, the receiving groove 114 can also be a slot defined in the housing 10, correspondingly, the strips 112 can be omitted. The housing 10 can be just a base for mounting the catching mechanism 20 and the SIM card 30 without defining the receiving cavity 102 for the battery.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A SIM card holder comprising:
    a base defining a receiving groove and a slot, the receiving groove being configured for receiving a SIM card therein, the base comprising a protrusion, the protrusion and the slot being arranged at two opposite sides of the receiving groove; and
    a catching mechanism comprising a main board having a bending piece and a bending hem at two respective opposite ends thereof, the bending piece being detachably engaged with the base, an engagement of the bending piece and the base preventing the catching mechanism from sliding along a first direction from the protrusion to the slot and parallel to the base, the bending hem being constantly retained in the slot of the base, the main board comprising an elastic slice configured for resisting the protrusion of the base and for preventing the catching mechanism from sliding along a second direction opposite to the first direction when the bending piece is engaged with the base, the catching mechanism being movable along the second direction relative to the base and rotatable about the end of the bending hem when the slice disengages from the protrusion.

2. The SIM card holder as claimed in claim 1, wherein the base defines an opening for exposing a connector connected to a SIM card in the receiving groove, the opening corresponds to the receiving groove.

3. The SIM card holder as claimed in claim 1, wherein the base is substantially cuboid in shape, and has a front surface and a back surface, and the receiving groove is located at the front surface.

4. The SIM card holder as claimed in claim 3, wherein the housing forms a batten and a projection at two opposite edges of the slot at the back surface, two posts are formed at two ends of the batten.

5. The SIM card holder as claimed in claim 4, wherein the bending hem comprises a first bent portion bent substantially perpendicularly downward from the end of the main board, and a second bent portion bent substantially perpendicularly outward from a free end of the first bent portion, the first bent portion extending through the slot and the second bent portion abuts with the back surface when the bending piece is engaged with the base.

6. The SIM card holder as claimed in claim 3, wherein the bending piece comprises a first bent portion bent substantially perpendicularly downward from the end of the main board, and a second bent portion bent substantially perpendicularly inward from a free end of the first bent portion, the second bent portion abutting with the back surface when the bending piece is engaged with the base.

7. The SIM card holder as claimed in claim 5, wherein a warp is formed at the end of the bending hem by bending the end of the bending hem, the SIM card holder further comprises a block disposed at the slot of the base, the block defining two holes for engaging with the posts of the housing to attach the block, the block and the base cooperatively define a gap receiving and retaining the warp.

8. The SIM card holder as claimed in claim 1, wherein the elastic slice extends slantwise from the main board, and forms a rolled potion at a free end thereof for resisting the protrusion.

9. An electronic device comprising:
  front and rear covers cooperatively defining an enclosed space; and
  a SIM card holder mourned in the enclosed space, the SIM card holder comprising:
  a base defining a receiving groove and a slot, the receiving groove being configured for receiving a SIM card therein, the base comprising a protrusion, the protrusion and the slot being arranged at two opposite sides of the receiving groove; and
  a catching mechanism comprising a main board having a bending piece and a bending hem at two opposite ends thereof, the bending piece being detachably engaged with the base and thereby being configured for preventing the catching mechanism from sliding along a first direction from the protrusion to the slot and parallel to the base, the bending hem being constantly retained in the slot of the base, the main board comprising an elastic slice configured for resisting the protrusion of the base and for preventing the catching mechanism from sliding along a second direction opposite to the first direction when the bending piece is engaged with the base, the catching mechanism being movable along the second direction relative to the base and rotatable about the end of the bending hem when the slice disengaging with the protrusion.

10. The electronic device as claimed in claim 9, wherein the base is substantially cuboid in shape, and has a front surface and a back surface, and the receiving groove is located at the front surface.

11. The SIM card holder as claimed in claim 10, wherein the base defines a cavity adjacent the receiving groove, the base has a wall portion facing the cavity, the wall portion defines a cutout therein, and the second bent portion of the bending piece extends to the back surface via the cutout.

12. The SIM card holder as claimed in claim 10, wherein the bending hem comprises a first bent portion bent substantially perpendicularly downward from the end of the main board, and a second bent portion bent substantially perpendicularly outward from a free end of the first bent portion, the first bent portion extending through the slot, and the second bent portion abuts with the back surface when the bending piece is engaged with the base.

13. The SIM card holder as claimed in claim 10, wherein the bending piece comprises a first bent portion bent substantially perpendicularly downward from the end of the main board, and a second bent portion bent substantially perpendicularly inward from a free end of the first bent portion, the second bent portion abutting with the back surface when the bending piece is engaged with the base.

14. The SIM card holder as claimed in claim 12, wherein a warp is formed at the end of the bending hem by bending the end of the bending hem, the SIM card holder further comprises a block disposed at the slot of the base the block defining two holes for engaging with the posts of the housing to fix the block, the block and the base cooperatively define a gap receiving and retaining the warp.

15. The electronic device as claimed in claim 9, wherein the elastic slice extends slantwise from the main board, and forms a rolled portion at a free end thereof for resisting the protrusion.

16. A SIM card holder for an electronic device, the holder comprising:
  a base defining a receiving groove having a first end and a second end and configured for receiving a SIM card therein, the base including a protrusion adjacent to the first end; and
  a catching mechanism comprising a main board having a first end extending through and retained by the base adjacent to a first side of the receiving groove, and a second opposite end detachably attached to the base adjacent to an opposite second side of the receiving groove to allow the main board to cover the receiving groove, the main board of the catching mechanism forming a resilient portion configured for resisting the protrusion of the base and for preventing the catching mechanism moving in a direction parallel to the base toward the second end, the main board being movable in said direction parallel to the base and rotatable about the first end of the main board when the resilient portion disengages from the protrusion.

17. The SIM card holder of claim 16, wherein the base includes a stopping member arranged so as to prevent the first end of the main board from being removed therefrom.

18. The SIM card holder of claim 17, wherein the stopping member comprises a discrete block connected with the base at a back side thereof opposite the receiving groove.

* * * * *